United States Patent [19]

Nakamura

[11] Patent Number: 4,882,825
[45] Date of Patent: Nov. 28, 1989

[54] METHOD OF CONNECTING A TUBULAR MEMBER WITH AN ANNULAR MEMBER

[75] Inventor: Masanobu Nakamura, Kamakura, Japan

[73] Assignee: Kokan Kako Co., Ltd., Yokohama, Japan

[21] Appl. No.: 114,631

[22] Filed: Oct. 28, 1987

Related U.S. Application Data

[63] Continuation of Ser. No. 812,242, Dec. 23, 1985, abandoned, which is a continuation-in-part of Ser. No. 532.315, Sep. 15, 1983, abandoned.

[30] Foreign Application Priority Data

Jan. 14, 1983 [JP] Japan .................................. 58-3548
Feb. 8, 1983 [JP] Japan .................................. 58-18180

[51] Int. Cl.[4] .............................................. B23P 15/00
[52] U.S. Cl. ............................ 29/156.4 R; 29/421.1; 74/567; 419/48
[58] Field of Search .............. 29/421 R, 523, 156.4 R; 74/567; 419/48

[56] References Cited

U.S. PATENT DOCUMENTS

| | | | |
|---|---|---|---|
| 3,183,394 | 5/1965 | Hipszer | 29/523 X |
| 3,467,180 | 9/1969 | Pensotti | 29/523 X |
| 3,553,809 | 1/1971 | Yamada et al. | 29/523 X |
| 3,977,068 | 8/1976 | Krips | 29/421 R |
| 4,069,573 | 1/1978 | Rogers, Jr. et al. | 29/421 R |
| 4,236,923 | 12/1980 | Takahashi et al. | 419/48 |
| 4,265,388 | 5/1981 | Takahashi et al. | 29/523 X |
| 4,293,995 | 10/1981 | Jordan | 29/421 R |
| 4,332,073 | 6/1982 | Yoshida | 29/421 R |
| 4,368,571 | 1/1983 | Cooper, Jr. | 29/421 R |

FOREIGN PATENT DOCUMENTS

| | | | |
|---|---|---|---|
| 39356 | 4/1981 | Japan | 74/567 |
| 149655 | 9/1982 | Japan | 74/567 |
| 1117816 | 6/1968 | United Kingdom | 74/567 |
| 2050207 | 1/1981 | United Kingdom | 29/523 |

Primary Examiner—Charlie T. Moon
Attorney, Agent, or Firm—Zarley McKee, Thomte, Voorhees & Sease

[57] ABSTRACT

A method of securing a tubular member within an annular cam member for the manufacture of a cam shaft is provided, including the steps of forming a cam member from sintered materials with at least two axially extending grooves being provided in the inner surface of the cam member adjacent the portion of the cam member having the greatest thickness such that a radially projecting ridge is defined between adjacent grooves, fitting the tubular member into the cam member, supplying a working fluid to the interior of the tubular member and applying pressure to the fluid so as to expand the tubular member while maintaining substantially the same wall thickness within the cam member until the ridge bites into the outer surface of the expanding tubular member and becomes tightly engaged therewith. The pressure applied to expand the tubular member is less than that required to fully expand the tubular member along the inner surface of the cam member.

1 Claim, 2 Drawing Sheets

METHOD OF CONNECTING A TUBULAR MEMBER WITH AN ANNULAR MEMBER

This application is a continuation of applicant's co-pending application Ser. No. 812,242, filed Dec. 23, 1985, now abandoned, which was a continuation-in-part of applicant's co-pending application Ser. No. 532,315 filed Sept. 15, 1983, now abandoned.

This invention relates to a method for connecting a tubular member with an annular member, such as a gear, a cam and so on, which surrounds the tubular member and in particular to such a method which makes use of fluid pressure for deforming the configuration of the tubular member in such a manner that the tubular member is fixedly secured to the inner circumference of the annular member.

Conventionally, a shaft carrying a cam, a gear or other radially protruding members was made by directly forging or casting the cam or the gear as an integral part of the shaft. However, there is great difficulty in forming the shaft as a hollow body. The bore of such a hollow shaft is often highly useful as a channel for a lubricant, a coolant or the like.

In view of this difficulty and a practical demand for a hollow shaft carrying a cam, a spur gear or the like, it has been proposed to make use of fluid pressure for deforming a tubular member outwardly so that the outer circumference of the tubular member becomes securely engaged with the inner circumference of the cam or the gear and a shaft carrying a cam or the like thereon as an integral part may be produced.

For instance, such a method is proposed in Japanese Patent Publication No. 49-28298. According to this invention, the inner circumference of the annular radially projecting member is formed slightly ovalshaped so that when a tubular member is inserted into this inner circumference and deformed outwardly through application of pressure to the interior of the tubular member, the tubular member becomes securely engaged with the inner circumference of the annular member. However, according to this method, the deformation of the tubular member is required to be relatively great in order to assure sufficient strength in the connection between the tubular member and the annular member. And when this deformation is great, thin portions tend to be produced in the tubular member because of uneven extension in localized portions of the tubular member.

Japanese patent application No. 59-966 discloses a similar method which, however, does not require such a great and localized deformation in the tubular member. According to this invention, axially extending rows of projections of a triangular cross-section are formed on the inner periphery of a cam and these rows of protrusions assure secure connection between the cam and the tubular member. However, since the pressure required to be applied to the interior of the tubular member becomes so great in particular in the last phase of the deformation that equipment for achieving the necessary pressure tends to be expensive and prone to frequent failures due to the complexity of the equipment. Furthermore, since the free ends of these projections are fairly sharp and have a tendency to cause cracks in the tubular member, causing unpredictable decrease in the strength of the tubular member itself.

In view of such inconveniences and shortcomings of conventional methods for connecting a tubular member and a cam or the like, a primary object of this invention is to provide such a method which is free from the above-described inconveniences and shortcomings.

According to this invention, such an object is accomplished by providing a method of engaging a tubular member with the inner circumference of a substantially annular member, the inner circumference of the annular member being provided with a certain irregularity therein, comprising the steps of forming an annular cam member from sintered materials with at least two axially extending grooves in the inner surface of the cam member adjacent the thickest portion of the cam member so as to define a radially projecting ridge between adjacent grooves, fitting the tubular member into the cam member, supplying a working fluid into the interior of the tubular member, and applying pressure to the working fluid so as to expand the tubular member while maintaining substantially the same wall thickness within the cam member until the ridge bites into the outer surface of the expanding tubular member to become tightly engaged therewith. The pressure is terminated while there is still some clearance between the tubular member and the annular member adjacent the grooves.

Other objects and features of the present invention will become better understood through a consideration of the following description taken in conjunction with the accompanying drawings in which.

Figure 1:
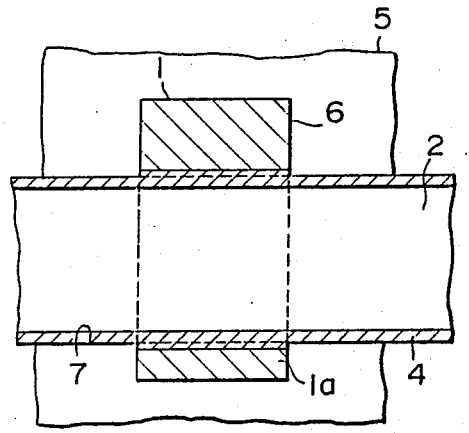
FIG. 1 is a longitudinal sectional view showing how a cam is securely fit onto a tubular member according to a conventional method.
Figure 2:
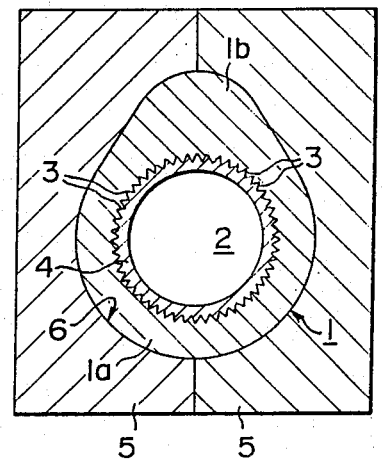
FIG. 2 is a cross-sectional view taken along the shaft-cam assembly in FIG. 1.
Figure 3:
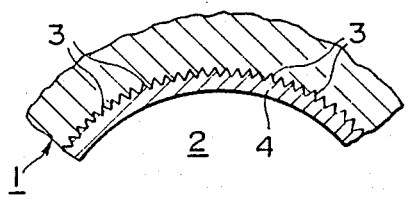
FIG. 3 is a magnified view showing an essential part of FIG. 2.

FIGS. 1 and 3 schematically illustrate a conventional method of manufacturing a cam shaft according to a process generally known as bulge working. As shown in FIG. 1, a multiplicity of axially extending grooves 3 are formed in the internal circumferential surface of a central bore of a cam 1. These axially extending grooves 3 present a triangular cross-section and define sharp ridges therebetween.

After inserting a tube 4 into the central bore of the cam 1 and placing the assembly consisting of the tube 4 and the cam 1 into a bulge mold 5 for preventing any external deformation of the assembly through intimate contact with a mold surface 6, pressure is applied to the interior 2 of the tube 4, for instance hydraulically, so that the tube 4 is radially expanded until its outer circumference becomes deformed to the configuration defined by the internal circumference of the cam 1. Since the external surface of the tube 4 becomes closely engaged with the axially extending grooves 3 on the inner circumference of the cam 4, the tube 4 and the cam 1 become securely attached to one another.

However, in order to deform the outer circumferential surface of the tube 4 to the grooved surface of the cam 1, it is necessary to apply an extremely high pressure to the interior of the tube 4 as well as to make sharp the free ends of the ridges defined between the grooves 3.

Figure 4:
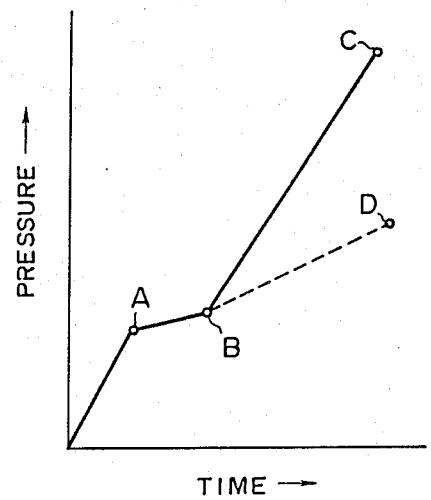
FIG. 4 is a graph showing the level of pressure which is required for achieving the necessary deformation of the tubular member.

In FIG. 4, the solid line denotes the changes of the pressure required to be applied to the interior 2 of the tube 4 to the end of achieving the desired result according to this conventional method. As the tube 4 initially expands radially and outwardly, the pressure gradually rises to a point A at which part of the ridges on the internal surface of the cam 1 contacts the outer circumference of the tube 4 and the increase in the pressure drops.

When all the ridges on the internal surface of the cam 1 have contacted the outer surface 7 of the tube 4, an extremely high pressure becomes necessary to deform the outer surface 7 of the tube 4 to the opposing surface since bending of the tube wall is not sufficient for achieving the desired deformation and the outer portion of the tube wall is required to slip into the grooves 3 of the internal surface of the cam 1. As a result, according to this conventional method, the ultimate pressure level required for achieving the desired deformation is extremely high as indicated by a point C in FIG. 4.

Since the sharp ridges are required to eat into the outer surface of the tube 4 in order to assure secure engagement between the cam 1 and the tube 4, there is a strong tendency for cracks to generates in the bottoms of the grooves 3 in the most thin part 1a of the cam 1. Since the cam 1 is subjected to a heavy load in operation, this possibility of crack generation is highly undesirable.

Furthermore, since the sharp ridges eat into the outer surface of the tube 4, thinned portions are produced in the tube wall opposite to the ridges on the inner circumferential surface of the cam 1. This tends to reduce the strength of the tube 4, in particular against the twisting load.

This invention was made in order to eliminate the above-described shortcomings of conventional bulge working processes and a few embodiments thereof are described in the following with reference to FIGS. 4 to 8.

Figure 5:
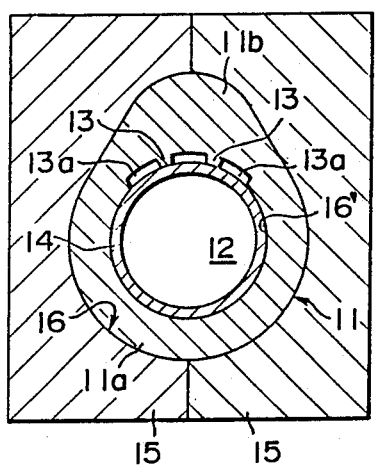
FIG. 5 is a cross-sectional view similar to FIG. 2, illustrating an embodiment of the method of this invention, before the tubular member has deformed.

As shown in FIG. 5 which illustrates the first embodiment of this invention, three axially extending grooves 13a of a substantially rectangular cross-section are formed in the inner circumferential surface of the lobe part 11b of the greatest thickness of a cam 11, defining substantially flat-top ridges 13 therebetween. These grooves 13a are similar to normal key grooves in configuration and extend along the axial direction in a mutually spaced and parallel relation. The circumferential width of these grooves 13 are selected to be no less than 1.5 times the thickness of the tube wall. Preferably cam 11 is made of sintered materials.

Figure 6:
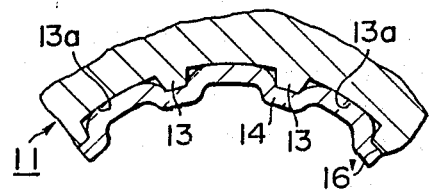
FIG. 6 is a magnified view of an essential part of FIG. 5, after the tubular member has finally deformed.

"By inserting a tube 14 into a central bore of the cam 11, placing the assembly into a bulge mold 15". having a mold surface 16 intimately contacting the external surface of the assembly and radially expanding the tube 14 through application of pressure from the interior 12 of the tube 14, the tube wall is deformed into a shape adapted to the grooved inner surface 16' of the cam 11 without causing substantial variation in the thickness of the tube wall. When the tube wall has finally deformed as shown in FIG. 6 leaving some clearance between the tube 14 and the internal surface 16' of the cam 11 in particular along the side corners of the grooves 13, the tube 14 and the cam 11 become securely attached to one another since the side ends of the grooves 13 become fully engaged with the deformed part of the tube wall.

The pressure changes in the interior 12 of the tube 14 during this deformation process is substantially identical to that in the previously described conventional method up to the point B as shown in FIG. 4. The pressure change in this case follows the dotted line indicated in FIG. 4, instead of the solid line of the same graph.

Specifically, as the pressure is further increased, the tube wall of the tube 14 undergoes bending and extending deformation into the grooves 13, requiring a substantially less pressure rise in the process as compared with the case of the previously described conventional method until the tube 14 and the cam 11 becomes securely engaged to one another at a pressure level D which is substantially lower than the point C as shown in FIG. 4.

Figure 7:
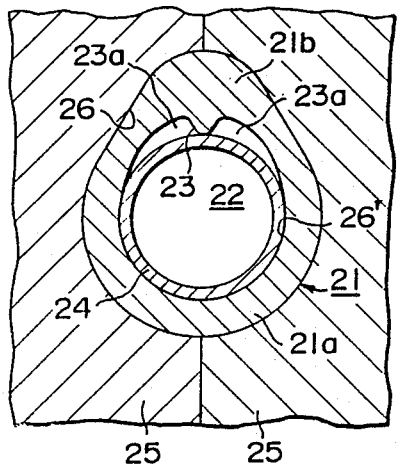
FIG. 7 is a cross-sectional view similar to FIG. 2, illustrating another embodiment of the method of this invention, before the tubular member has finally deformed.
Figure 8:
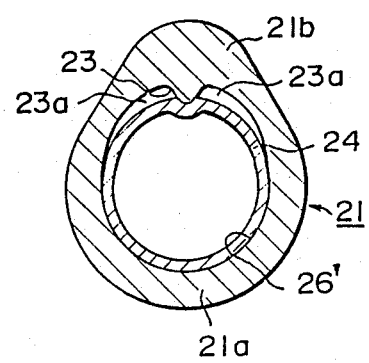
FIG. 8 shows a part of FIG. 7, after the tubular member has finally deformed.

FIGS. 7 and 8 illustrate a second embodiment of this invention. According to this embodiment, a central bore defined in a cam 21 is oval-shaped and a ridge 23 which projects radially inwardly is provided in the pointed end of the oval-shaped bore (the upper end of the central bore in FIGS. 7 and 8).

A tube 24 is first inserted into this central bore of the cam 21 and the assembly consisting of the tube 24 and the cam 21 are fit into a bulge mold 25 having an internal mold surface 26 which is adapted to the external surface configuration of the assembly and consisting of two halves. A working fluid is introduced into the interior 22 of the tube 24 and pressure is applied to the working fluid.

As a result, the tube 24 expands radially outwardly until a part of the tube contacts the ridge 23. As the pressure is further increased, the tube deforms further in particular in the part of the tube 23a adjacent to the the ridge 23 protruding from the inner surface 26' of the cam until the tube 24 becomes fully engaged with the protruding ridge 23 against any relative rotational movement therebetween.

The application of pressure is terminated at this point while there is some clearance between the tube and the bore of the cam. A very high pressure would be necessary if the tube is to be deformed until its external configuration becomes completely adapted to the internal configuration of the cam. Hence, according to this invention, the level of pressure required for the final deformation is substantially less than that required in carrying out a similar process according to the conventional methods.

Thus, according to the present invention, the pressure required for bulge forming a tube into a secure engagement with an annular member is substantially lower than that required for achieving a similar process according to the conventional methods. Furthermore, there is no local weak spot in the thin portion of the cam and the strength of the cam is not reduced as a result of the bulge forming. And, since the thickness of the tube wall remains uniform after the bulge forming and the strength of the tube is also preserved.

Although the present invention has been described in detail in terms of concrete embodiments thereof, it is obvious to a person skilled in the art that various modifications and variations are possible without departing from the spirit of this invention which is set out in the appended claims.

What is claimed is:

1. A method of connecting a tubular member with a cam member, for manufacturing a camshaft thereby, comprising the steps of:

fitting said tubular member into a central bore in said cam member, the inner circumference of the cam member being provided with axially extending grooves defining substantially flat bottom ridges and substantially flat bottom valleys located only in the lobe part of the inner circumference of the cam member corresponding to the part of the inner circumference of the cam member corresponding to the part of the cam member with the greatest wall thickness, so that the inner circumference is not smooth, the width of the grooves being no less than 1.5 times the wall thickness of the tubular member and being substantially rectangular in cross section;

placing said cam member in a bulge mold; supplying a working fluid into the interior of said tubular member and applying sufficient pressure to the working fluid to forcibly expand the tubular member in an area adjacent the thickest lobe part of the wall of the cam member so that at the outer circumference of the tubular member is deformed in said area and engaged into said valleys so as to form corresponding blunt projections on the outer circumference of the tubular member, so that the outer circumference is not smooth, without substantially reducing its wall thickness; and terminating said application of pressure to the working fluid when said projections on the outer circumference of the tubular member are sufficiently engaged into said grooves to mechanically lock both members together, such termination of pressure being before the tubular member is completely deformed along the shape of the grooves so as to leave some clearance between the inner wall of the grooves and the expanded outer circumference of the tubular member.

* * * * *